United States Patent [19]
Derryberry

[11] Patent Number: 5,077,927
[45] Date of Patent: Jan. 7, 1992

[54] FISHERMAN'S TOOL LANYARD

[76] Inventor: Jerral W. Derryberry, 825 Calle Mejia, No. 501, Santa Fe, N. Mex. 87501

[21] Appl. No.: 591,044
[22] Filed: Oct. 1, 1990
[51] Int. Cl.$^5$ .............................................. A01K 31/06
[52] U.S. Cl. ........................................ 43/4; 43/54.1; 224/103
[58] Field of Search ................. 43/4, 54.1, 57.1, 57.2; 224/103, 251, 265, 269, 920

[56] References Cited

U.S. PATENT DOCUMENTS 2,297,623  9/1942  Hickman ............................. 224/103
3,269,622  8/1966  Wood .................................. 224/103
3,893,605  7/1975  Mew ................................... 224/103
4,577,433  3/1986  Jones .................................. 43/57.2

Primary Examiner—Richard K. Seidel
Assistant Examiner—Patty Hong
Attorney, Agent, or Firm—Donovan F. Duggan

[57] ABSTRACT

The present invention is a tool lanyard specifically designed to aid the fly fisherman in his sport. The tool lanyard is assembled with a cable or on a monofilament line under tension such that the snap swivels, beads and tubing that are under compression result in an assembly in which the snap swivels stand out from the lanyard and the resultant friction keeps the snap swivels from moving around at will so that all items attached are well spaced and stay where they are positioned.

17 Claims, 1 Drawing Sheet

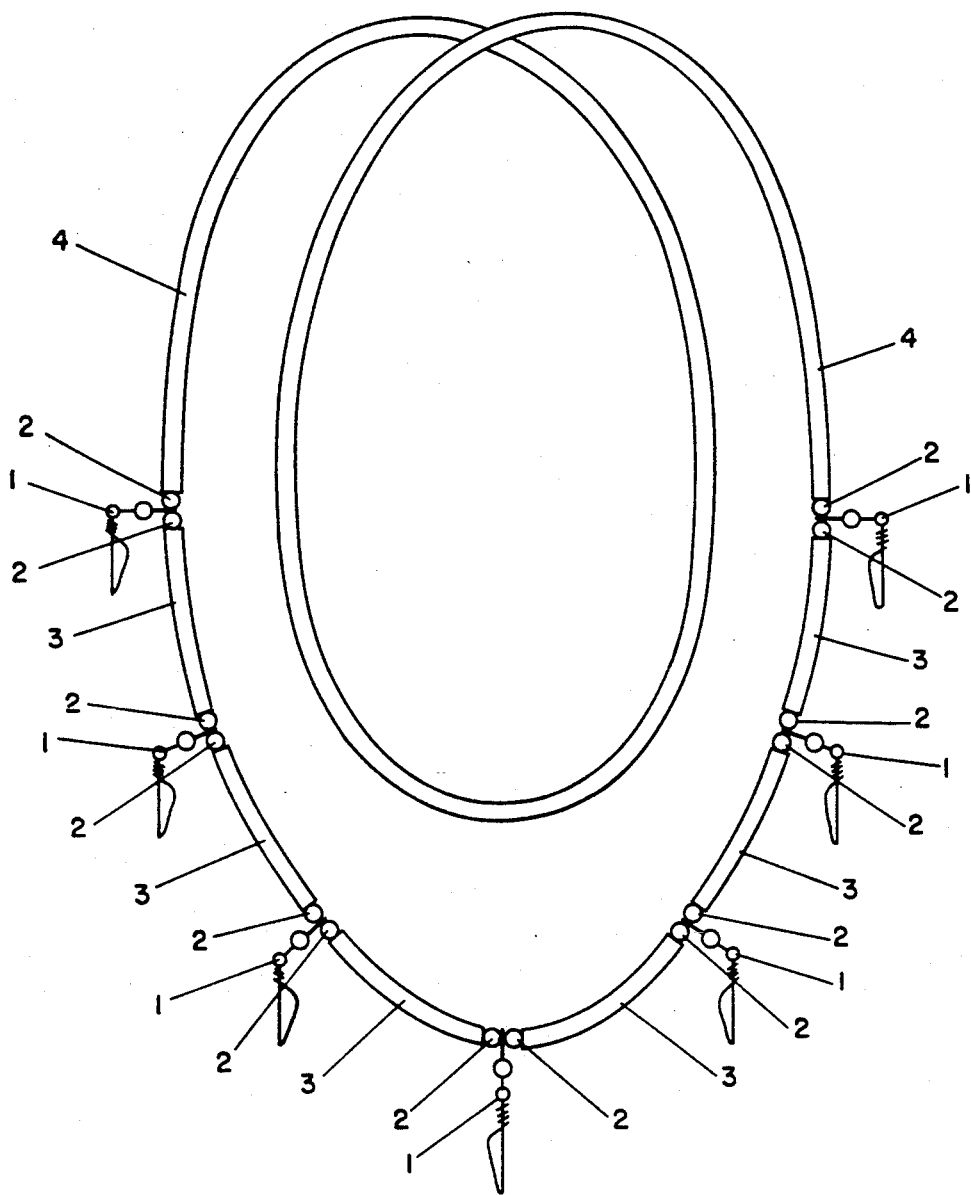
FIG—1
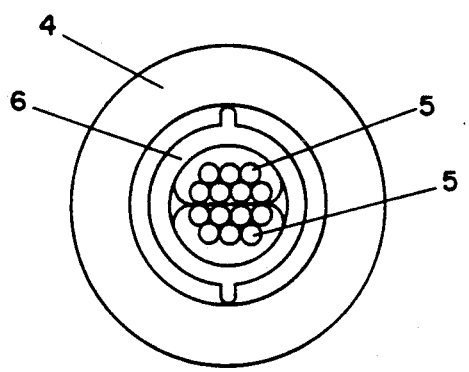
FIG—2

FISHERMAN'S TOOL LANYARD

FIELD OF THE INVENTION

This invention relates to a fisherman's tool lanyard.

PRIOR ART

Many attempts have been made heretofore unsuccessfully to produce a workable fisherman's tool lanyard. The first attempts were prior to lanyards and involved pockets and strings. After that, numerous ancient tool lanyards were attempted, but were not successful.

BRIEF DESCRIPTION OF THE INVENTION

The Fisherman's Tool Lanyard is a system of marlin-style snap swivels separated at intervals by industrial grade, resilient, soft vinyl tubing with plastic bead wear guards all of which is strung on nylon monofilament line or nylon coated stainless steel cable. The monofilament or cable is under slight tension and that puts the vinyl tubing, beads and snap swivels under compression making the snap swivels stand out away from the lanyard and the friction resulting from the compression keeps those same snap swivels from freely rotating around the lanyard. The result is that the fisherperson can comfortably and readily find whatever is needed immediately and without looking.

BRIEF DESCRIPTION OF THE SEVERAL VIEWS OF THE DRAWING

The attached drawing shows the different views of the invention.

FIG. I is a view in perspective of the fisherman's tool lanyard of the invention.

FIG. II is a cross section of the fisherman's tool lanyard of the invention.

DETAILED DESCRIPTION

The Fisherman's Tool Lanyard is made by utilizing: heavy duty stainless steel snap swivels (1) abutted on each of their two sides by plastic wear guard beads (2). Each such assembly is snugly and securely held in place and separated from the other such assemblies by several short sections (3) and a long section (4) of industrial grade, resilient, soft vinyl tubing or its equal. All of these parts are held in compression along their tubular lengths and held in place by insertion of a piece of heavy gage monofilament line or plastic coated stainless steel cable (5) with its two ends held under slight tension and securely fastened to each other by a brass or stainless steel compression sleeve (6). By adjusting the jaws of the compression tool which secures the sleeve the strength of the connection may be adjusted such that the connection is lesser in strength than the cable or monofilament line or the wearer's neck.

ADVANTAGES OF THE INVENTION

1. All previous tool lanyards designed for fishermen used a bare monofilament line or leather string as the neck strap. In opposition to such previous designs, The Fisherman's Tool Lanyard has an industrial grade, resilient, soft vinyl tubing cover to cushion the wearer's neck from lanyard's load on its internal cable or monofilament line.

2. All previous tool lanyards designed for fishermen have had the snap swivels and/or beads hanging loose on a monofilament line or leather string allowing the tools to constantly shift and change position and thus fouling each other. The Fisherman's Tool Lanyard's combination of compression of strung parts causing the snap swivels to stand out, friction between the snap swivels and beads holding the snap swivels in place and the clinging nature of the soft resilient vinyl tubing against the wearer's clothes or bare neck, make all the attached tools remain where positioned and thereby immediately at hand.

3. All previous tool lanyards have been too short for good visual use while on the wearer's neck. The Fisherman's Tool Lanyard's generous 42± inch unconnected length, when assembled, provides optimum eye focal length for detailed work on delicate flies and extremely light tippets in low light without having to remove the lanyard from the wearer's neck in order to use it.

4. The Fisherperson who wishes to wade or float over deep water and/or strong currents may now do so with the convenience of his or her tools and supplies worn on a lanyard over the top of a life vest. Heretofore this was impractical as fishing tools have been customarily carried or attached to a fly fishing vest which would conflict with the life vest.

5. Fishing guides and teachers who need to provide tools and supplies for their clients and students may do so with reduced fear of loss of those same tools and supplies and without the cost of supplying students with expensive fly fishing vests.

6. Fisherpersons fishing from canoes and small boats no longer need to keep their most-needed tools and supplies in a tackle box, which makes noise when opened in the bottom of a boat and can be dangerous if overturned.

7. Those fisherpersons who wish to travel far on foot to fish may now do so much lighter, cooler and easier by using The Fisherman's Tool Lanyard and a fanny pack as opposed to the usual hot, heavy and cumbersome fly vest.

8. When fishing saltwater flats heretofore there was no reasonable system for carrying needed tools and supplies. Standard fly fishing vests tend to get foul and rot in saltwater conditions and tackle boxes are totally impractical to carry while stalking fish with a fly rod.

It will be appreciated that many variations are possible without departing from the scope of the invention. Accordingly, I intend to be bound openly by the following patent claims.

I claim:

1. A fisherman's tool lanyard for securing fishing tackle comprising:
    cable means;
    tubular segmented means under compression enclosing said cable means; and
    means for securing fishing tackle comprising swivel attachment means between the segments of said tubular segmented means.

2. The invention of claim 1 wherein the ends of said cable means are secured together under tension by compression sleeve means.

3. The invention of claim 1 wherein said cable means comprises stainless steel cable means.

4. The invention of claim 1 wherein said cable means comprise, monofilament line means.

5. The invention of claim 1 wherein said tubular segmented means comprises a plurality of sections of soft resilient tubing.

6. The invention of claim 1 wherein said tubular segmented means further comprises a single elongate section of said soft resilient tubing.

7. The invention of claim 1 wherein said tubular segmented means are further separated by bead means.

8. The invention of claim 7 wherein said bead means are positioned on each side of said swivel attachment means.

9. A fisherman's tool lanyard for securing fishing tackle comprising: tensioned cable means whose ends are fastened together by compression sleeve means;
    soft vinyl tubing means enclosing said cable means, a unitary portion of said tubing means covering a majority of said cable means, a segmented portion of said tubing means covering the remainder of said cable means;
    a plurality of tool holding assembly means placed on said cable means in alternating relation with the segments of said soft vinyl tubing means, such that each said assembly means has positioned on either side a segment of said soft vinyl tubing means; and
    wherein each of said assemblies comprises two plastic beads sandwiching a snap swivel.

10. A method of securing fishing tackle comprising the steps of:
    providing a cable;
    enclosing the cable with tubular segments under compression;
    providing swivel attachment devices between the tubular segments;
    securing fishing tackle to the swivel attachment devices.

11. The method of claim 10 wherein the step of providing a cable includes the step of securing the ends of the cable by a compression sleeve.

12. The method of claim 10 wherein the step of providing a cable comprises the step of providing a stainless steel cable.

13. The method of claim 10 wherein the step of providing a cable comprises the step of providing a monofilament line.

14. The method of claim 10 wherein the step of enclosing the cable with tubular segments under compression includes the step of providing a plurality of sections of soft resilient tubing.

15. The method of claim 10 wherein the step of enclosing the cable with tubular segments under compression includes the step of providing a single elongate section of soft resilient tubing.

16. The method of claim 10 wherein the step of enclosing the cable with tubular segments under compression includes the step of separating the tubular segments by beads.

17. The method of claim 16 where the step of separating the tubular segments by beads includes the step of positioning the beads on each side of the swivel attachment devices.

* * * * *